United States Patent
Backlund

[11] 4,053,690
[45] Oct. 11, 1977

[54] THERMAL CELLS

[75] Inventor: John R. Backlund, Bloomington, Ill.

[73] Assignee: National Union Electric Corporation, Stamford, Conn.

[21] Appl. No.: 406,566

[22] Filed: Jan. 27, 1954

[51] Int. Cl.² .......................................... H01M 6/36
[52] U.S. Cl. .................................................. 429/112
[58] Field of Search ................ 136/4, 5, 90, 103, 112, 136/114, 136, 137, 153, 161

[56] References Cited

U.S. PATENT DOCUMENTS

| 3,345,214 | 10/1967 | Zauner et al. | 429/112 |
| 3,575,714 | 4/1971 | Bennett et al. | 429/112 |

Primary Examiner—Leland A. Sebastian
Attorney, Agent, or Firm—Merriam, Marshall & Bicknell

EXEMPLARY CLAIM

1. Multiple thermal cell construction comprising a cylinder having heat source material therein and forming one electrode of a cell, dry electrolyte in contact with the outer surface of said cylinder, a metal band enclosing said electrolyte and forming another electrode of said cell, a metal band on said cylinder in spaced and insulated relation with respect to said electrolyte and forming an electrode of another cell in series with said first mentioned cell, dry electrolyte in contact with said band and an outer band contacting said last mentioned electrolyte and forming another electrode of said last mentioned cell.

5 Claims, 2 Drawing Figures

U.S. Patent  Oct. 11, 1977  4,053,690

INVENTOR.
John R. Backlund
BY
E. J. Balluff

THERMAL CELLS

This invention relates to thermal cells and has particular reference to multiple cell construction.

Thermal cells may be defined as electrochemical power supplies based upon electrolytes of various inorganic salts which remain solid and non-conducting at all storage temperatures. The electrolyte melts and becomes conducting when the cell is heated to some elevated temperature and electrical energy may then be withdrawn from the system.

A principal object of the invention is to provide a new and improved construction for multiple thermal cells.

Figure 1:
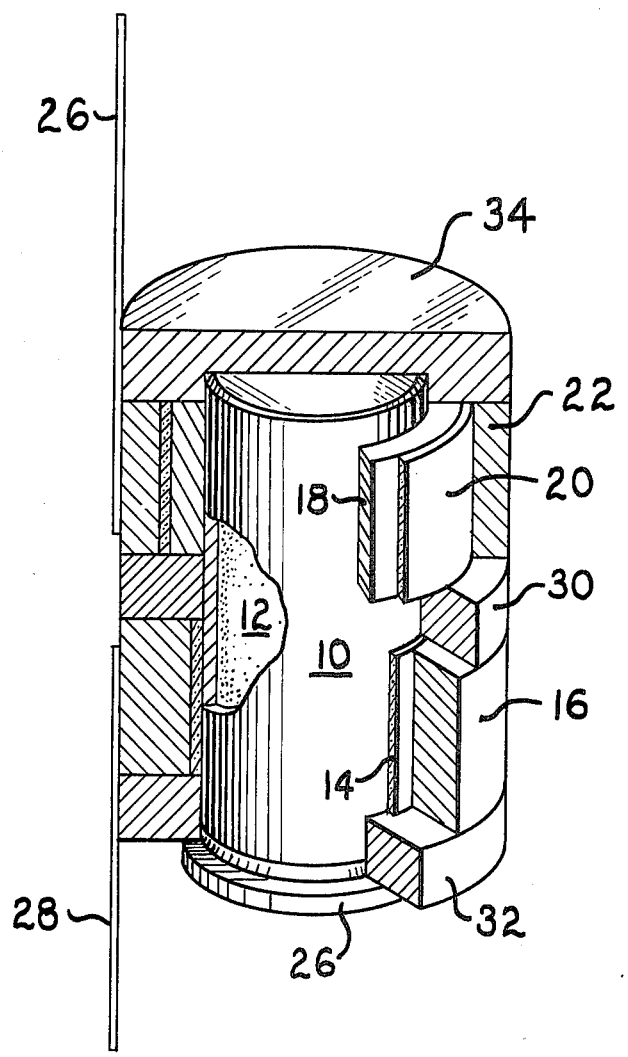
Figure 2:
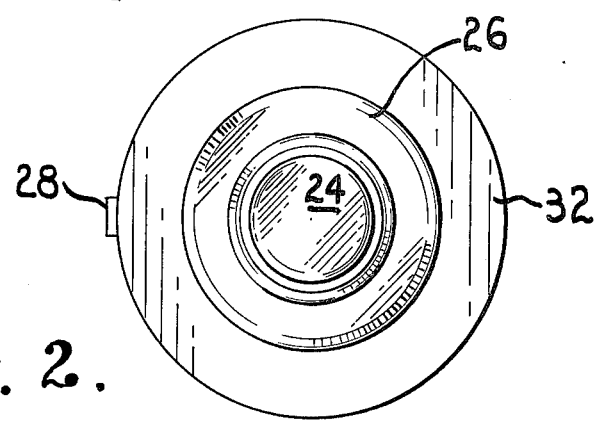

Other objects and advantages of the invention will be apparent from consideration of the following specification taken in conjunction with the accompanying drawing of which there is one sheet and wherein:

FIG. 1 is an enlarged perspective view of a cell unit embodying the invention with parts thereof broken away; and FIG. 2 is an end view.

As illustrated in the embodiment of the invention selected for purposes of illustration, a multiple thermal cell unit comprises a cylinder 10 having heat source material 12 therein and forming one electrode of a cell. A band 14 of dry electrolyte is disposed in intimate contact with the outer surface of the cylinder 10 and a metal band 16 is arranged in contact with the band 14 of electrolyte and encloses the same, such band 16 forming one electrode of a cell while the cylinder 10 forms the other electrode thereof.

A metal band 18 is disposed on said cylinder 10 in spaced and insulated relation with respect to electrolyte 14 and forms an electrode of a second cell in series with the first mentioned cell. A band 20 of dry electrolyte is arranged in contact with the outer surface of the band 18 and an outer band 22 of metal forming another electrode of the second cell is arranged in contact with the band of electrolyte 20 and forms another electrode of the second cell.

The heat source material 12 preferably comprises any material capable of producing, when ignited, a controlled amount of heat without evolution of gaseous combustion products, although depending upon the intended use of the cell, other heat sources may, if desired, be employed. In the present instance heat source material is ignited by a percussion type primer 24 which is mounted in the end 26 of the cylinder and which primer is operable when set off to ignite the heat source material 12.

The dry electrolyte may for example comprise equal parts by weight of potassium chloride and lithium chloride or any other suitable dry electrolyte. For convenience in manufacture a glass fiber matrix may be impregnated with the electrolyte when the latter is in a molten condition. The cathodes are coated with a depolarizing agent such for example as a vanadium oxide ($V_2O_5$).

The heat liberated by the combustion of the heat source material is transferred by the metal of the cylinder 10 to the electrolyte 14 and through the metal band 18 to the electrolyte 20 to activate such electrolyte. When the electrolyte is activated by heating, it melts and electrical energy may then be withdrawn from the system through the conductors 26 and 28 which are connected to the metal rings 16 and 22. The heat source material may for example be one of the so-called THERMIT powders consisting of iron oxide and finely divided aluminum or magnesium.

Cells constructed in accordance with this disclosure activate rapidly due to the intimate contact of the heat source material with its container 10. The combustion of such material expands the cylinder 10, thereby improving the contact between the electrode surfaces and the electrolyte. The cylinder 10 which may be of nickel-plated brass not only forms the electrode of one cell, but also serves to connect the two cells in series relation since it is in contact with the anode 18 of the upper cell. A band of insulation 30 separates the electrolyte 14 and the anode of the lower cell from the electrolyte and the electrodes of the upper cell. An insulating ring 32 may be mounted on the lower end of the unit and the top may be enclosed by a cap 34 of insulating material. This construction makes it possible easily and closely to control the thermal balance of the cell, and in addition lends itself to low cost and easy manufacture. The cathode 22 may be nickel, while the anode 16 and 18 may be magnesium.

While I have illustrated and described a preferred embodiment of our invention, it is understood that it is capable of modification and, therefore, I do not wish to be limited to the details as set forth herein but desire to avail myself of such changes and alterations as fall within the scope of the accompanying claims.

I claim:

1. Multiple thermal cell construction comprising a cylinder having heat source material therein and forming one electrode of a cell, dry electrolyte in contact with the outer surface of said cylinder, a metal band enclosing said electrolyte and forming another electrode of said cell, a metal band on said cylinder in spaced and insulated relation with respect to said electrolyte and forming an electrode of another cell in series with said first mentioned cell, dry electrolyte in contact with said band and an outer band contacting said last mentioned electrolyte and forming another electrode of said last mentioned cell.

2. Cell construction according to claim 1 including a percussion type primer associated with said cylinder and operable for igniting said heat source material.

3. Multiple thermal cell construction comprising a metal member forming one electrode of a cell, dry electrolyte in contact with the outer surface of said member, a metal band enclosing said electrolyte and forming another electrode of said cell, a metal band on said member in spaced and insulated relation with respect to said electrolyte and forming an electrode of another cell in series with said first mentioned cell, dry electrolyte in contact with said band and an outer band contacting said last mentioned electrolyte and forming another electrode of said last mentioned cell.

4. Multiple thermal cell construction comprising a cylinder forming one electrode of a cell, dry electrolyte in contact with the outer surface of said cylinder, a metal band enclosing said electrolyte and forming another electrode of said cell, a metal band on said cylinder in spaced and insulated relation with respect to said electrolyte and forming an electrode of another cell in series with said first mentioned cell, dry electrolyte in contact with said band and an outer band contacting said last mentioned electrolyte and forming another electrode of said last mentioned cell.

5. Cell construction according to claim 4 including heating means associated with said cylinder for activating said electrolyte.

* * * * *